United States Patent [19]

Hefley et al.

[11] 4,255,455

[45] Mar. 10, 1981

[54] PREPARATION OF CASEIN WITH LOWERED CHOLESTEROL CONTENT

[75] Inventors: Alta J. Hefley, Arlington Heights; Henry P. Furgal, Lombard, both of Ill.

[73] Assignee: Miles Laboratories, Inc., Elkhart, Ind.

[21] Appl. No.: 19,313

[22] Filed: Mar. 12, 1979

[51] Int. Cl.³ .............................. A23C 9/00; A23C 7/00
[52] U.S. Cl. .................................. 426/42; 426/422; 426/588; 426/657; 426/580
[58] Field of Search .................. 435/272, 267, 268; 426/34, 36, 491, 580, 56, 657, 422, 800, 614, 417, 429, 588, 42; 260/120

[56] References Cited

U.S. PATENT DOCUMENTS

| | | | |
|---|---|---|---|
| 1,209,539 | 12/1916 | Bartels | 260/120 |
| 2,006,700 | 7/1935 | Supplee | 260/120 |
| 2,034,056 | 3/1936 | Peebles | 260/120 |
| 2,744,891 | 5/1956 | Waugh | 260/120 |
| 3,040,018 | 6/1962 | Wingerd | 260/120 |
| 3,968,169 | 7/1976 | Seiden et al. | 260/338 X |

OTHER PUBLICATIONS

Webb, "Fundamentals of Dairy Chemistry", Avi Publishing Co., 1965, pp. 149–152.
Sutermeister et al., "Casein & its Industrial Applications", Reinhold Publishing Co., 1939, pp. 196, 253, 385–386.

*Primary Examiner*—R. B. Penland
*Attorney, Agent, or Firm*—Louis E. Davidson

[57] ABSTRACT

Casein with lowered cholesterol content is produced by dispersing within an aqueous medium containing casein and cholesterol an effective casein-cholesterol bond-reducing emulsifying agent, such as a polyglycerol fatty acid ester, and thereafter isolating the casein from the aqueous medium.

11 Claims, No Drawings

PREPARATION OF CASEIN WITH LOWERED CHOLESTEROL CONTENT

BACKGROUND OF THE INVENTION

Casein is a mixture of phosphoproteins naturally occurring in milk, cheese, beans and nuts. It is usually isolated from skim milk by isoelectric precipitation or by enzymatic coagulation. The isolated and recovered protein contains all of the common amino acids and is particularly rich in essential amino acids. Due to its desirable nutritional balance, casein is very useful as an ingredient in many food products such as simulated meats, cheeses and other dairy products. Unfortunately, the casein which is commercially available has the relatively high cholesterol content of between 15 and 30 mg/100 g. This high cholesterol level limits the use of casein in certain foodstuffs where a lower cholesterol level is desirable.

SUMMARY OF THE INVENTION

In accordance with the present invention, a process is provided for preparing casein with lowered cholesterol content. The process comprises the steps of dispersing a casein-cholesterol bond-reducing emulsifying agent within an aqueous medium containing casein and cholesterol and thereafter isolating the casein from the aqueous medium.

DESCRIPTION OF THE INVENTION

The emulsifying agents which are useful in this invention are those which are effective to reduce the amount of cholesterol bound to casein. Preferably, the emulsifier will have a hydrophilic lipophilic balance (HLB) of about 7 to 16 and will be soluble in aqueous media. Examples of such casein-cholesterol bond-reducing emulsifiers include the polyglycerol fatty acid esters and the sorbitol fatty acid esters. The polyglycerol fatty acid esters having an HLB between about 7.0 and 16 are preferred. The most preferred of these are octaglycerol monooleate, octaglycerol monostearate and triglycerol monostearate all of which are commercially available. These materials can be prepared by a variety of methods which are well known to those skilled in the art (see U.S. Pat. Nos. 3,968,169 and 3,882,258). For example, glycerol can be polymerized to form the polyglycerol. The polyglycerol, such as triglycerol or octaglycerol, can then be subjected to monoesterification conditions with a fatty acid, such as oleic, stearic and the like, to form the preferred emulsifiers such as octaglycerol monooleate, octaglycerol monostearate or triglycerol monostearate. Octaglycerol monooleate is a viscous (16,000 cps at 50° C.) liquid having a saponification number of about 77-88, an iodine value of 25-35 and an HLB of 13.0. Octaglycerol monostearate is a solid having a mettler dropping point of 52°-57° C., a saponification number of about 77-88, an iodine value of about 3.0 and an HLB of 13.0. Triglycerol monostearate is a solid having a mettler dropping point of 52°-55° C., a saponification number of 115-135 and an HLB of 7.2.

The sorbitol fatty acid esters preferably have an HLB between about 7 and 16. The most preferred of these materials are commercially available and include polyoxyethylene (20) sorbitan monostearate (HLB 14.9), polyoxyethylene (20) sorbitan monopalmitate (HLB 15.5) and the like. It will be appreciated by those skilled in the art that mixtures of these emulsifiers can also be prepared having an HLB in the desired range. For example, a mixture containing by weight 25% polyoxyethylene (20) sorbitan monostearate (HLB 14.9) and 75% sorbitan monostearate (HLB 4.7) has, as a blend, an HLB of 7.0. Other mixtures of emulsifiers can be prepared as is well known in the art to produce a blend with any HLB in the preferred range.

Suitable aqueous media containing casein and cholesterol which can be treated by this process are commercially available or can be easily prepared from commercially available materials. For example, commercial skim milk is an aqueous mixture containing casein and about 0.5 to 1.75 mg cholesterol per 100 ml. The aqueous medium can also be prepared from nonfat dry milk solids which contain about 15 to 30 mg cholesterol per 100 g or from commercial casein which contains about 15 to 30 mg cholesterol per 100 g. When so prepared, the aqueous medium will contain between 10 and 20 parts by weight milk solids or casein to 80 to 90 parts by weight water.

In practicing this invention, an effective casein-cholesterol bond-reducing emulsifying agent is dispersed within the above aqueous medium containing casein and cholesterol. The effective amount of the bond-reducing emulsifier, such as octaglycerol monooleate or octaglycerol monostearate, which is dispersed within the aqueous medium will depend upon the amount of cholesterol in the sample to be treated and the amount desired in the isolated casein, but it can be determined empirically without undue experimentation. It has been found, however, that the concentration of the emulsifier can be widely varied, from about 0.05 to 1.0% on a weight/volume basis based upon the total volume of the aqueous medium to be treated, to produce a low cholesterol content in the isolated casein. Preferably the emulsifier concentration will range from 0.2 to 0.5% on a weight/volume basis based upon the total volume of the aqueous medium.

Various means may be used to disperse the emulsifier within the aqueous medium. For example, the emulsifier may be added to the aqueous medium with agitation using any high speed mixing or shearing device. The amount of agitation is not critical as long as it is sufficient to disperse the emulsifier in the aqueous medium.

The temperature at which the aqueous medium is maintained can be widely varied from about 4° to 45° C. Preferably, the temperature is maintained at about 26° to 43° C.

The time during which the emulsifier is in contact with the aqueous medium before the casein is isolated can range from about 1 to 90 minutes. Very good cholesterol reductions in the isolated casein have been effected by contact of the emulsifier with the aqueous medium for about 15 minutes. Some samples, however, may require longer contact times to effect the desired cholesterol reduction. Preferably, the time of contact will vary between about 15 and 90 minutes. Longer contact times do not provide appreciable additional reduction in the cholesterol content of the isolated casein.

After treating the aqueous medium with the emulsifier the casein having lowered cholesterol content can be isolated by any well known means, such as isoelectric precipitation, enzymatic coagulation and the like. Isoelectric precipitation is the preferred means. If isoelectric precipitation is selected, the aqueous medium is heated to about 45° to 60° C. and the pH of the aqueous medium is adjusted to about pH 4.4 to 4.6 to precipitate the casein. The pH of the mixture before adjustment usually ranges between 6.0 and 7.0. The pH can be adjusted by the addition of any suitable acidic means, such as acetic acid, hydrochloric acid, lactic acid, phosphoric acid, sulfuric acid, acidic buffer salts and the like.

In the case of enzymatic coagulation, a suitable milk clotting enzyme is merely added to the emulsifier treated aqueous medium in sufficient quantity to coagulate the casein. Such enzymes include calf rennet, microbial rennet, and the like.

The thus isolated casein can be recovered from the soluble portion of the aqueous medium by any suitable means, including centrifugation, filtration, decantation and the like. Once recovered, the isolated casein can be pressed to remove excess moisture and used as-is or dried using such convenient means as spray drying, drum drying, freeze drying, vacuum drying and the like.

In some instances, the isolated casein may contain residual amounts of whey protein, soluble carbohydrates and mineral salts. These components can be removed by aqueous extraction, for example by using water (preferably warm) or water having an acid pH preferably about the isoelectric pH of the casein.

It will be appreciated by those skilled in the art that the above process can be practiced as a batch or continuous process and that the preferred conditions will vary depending upon the type of process or equipment selected. The above preferred conditions which have been described are based upon a batch mode. In a continuous process, it may be possible to reduce the contact times and concentrations and still achieve good cholesterol reduction.

The isolated casein having lowered cholesterol content can be used as-is to replace the commercial casein presently used in foodstuffs, thus desirably reducing the overall cholesterol level in the particular foodstuff. The casein may also be further processed to form a caseinate as is well known in the art and thus used to replace commercial caseinates.

The cholesterol content of the casein can be determined using a method based on the methods described in the A.O.A.C. Official Methods Of Analysis, Edition XII and the 2nd Supplement to Edition XII. A ten gram sample of the casein is placed into a 250 ml boiling flask and boiled with 10 ml of a potassium hydroxide (60% on a weight basis) solution and 30 ml of reagent alcohol for about an hour to saponify the sample. The resulting solution is then cooled and extracted three times with 100 ml portions of petroleum ether. The ether extracts are combined and washed two to three times with 75 to 100 ml portions of water. The washed ether extract is dried with anhydrous sodium sulphate, filtered and dried to a residue. To the residue, there is added 1.6 ml pyridine and 2.4 ml acetic anhydride and the mixture is heated in a steam bath until the reagents have evaporated to esterify the residue. The esterified residue is brought to 10 ml volume with chloroform. The cholesterol content is then measured by gas chromatography and compared with a standard cholesterol solution to determine the $\mu g$ cholesterol per 1 $\mu l$ of solution.

The following examples are illustrative of the invention and are not intended to limit the scope thereof.

EXAMPLE I

This Example illustrates the typical preparation of casein having lowered cholesterol content using the process of this invention.

Two separate 1 liter portions of skim milk were heated in a water bath to about 45° C. To one sample portion, representing a control sample, there was then added sufficient acetic acid (20–35% V/V) to adjust the pH of the mixture to about 4.6 and to precipitate the casein. The precipitated casein was separated from the mixture by decantation, washed six times with about 500 ml of warm water to remove residual soluble whey components and simply pressed to remove residual water. This control sample was assayed for moisture and for cholesterol content determined on a dry weight basis using the above described assay.

Into the remaining sample portion, representing a test sample, there was dispersed by mixing agitation about 3 grams of octaglycerol monooleate (Santone 8-1-0 available from Durkee Industrial Foods Group, SCM Corp.; this amount corresponds to 0.3% on a weight/volume basis based upon the total volume of the sample) and the thus treated sample was maintained at about 45° C. for 30 minutes. The sample was then treated with sufficient acetic acid (20–35% V/V) to adjust the pH to about 4.6 to precipitate the casein. The precipitated casein was separated from the mixture by decantation, washed six times with about 500 ml of warm water to remove residual soluble whey components and simply pressed to remove residual water. This test sample was assayed for moisture and for cholesterol content determined on a dry weight basis using the above described assay. The results of the cholesterol assay for both isolated casein samples are found in Table I.

TABLE I

| SAMPLE | CHOLESTEROL CONTENT* OF ISOLATED CASEIN | % CHOLESTEROL REDUCTION |
| --- | --- | --- |
| Control | 27.7 mg/100g | — |
| Test | 2.8 mg/100g | 90% |

*Cholesterol content is expressed on a dry weight basis.

The above data clearly illustrate the effectiveness of this process to significantly lower the cholesterol content of the thus isolated casein.

EXAMPLE 2

This Example illustrates the effect of the concentration of octaglycerol monooleate on the cholesterol content of the casein produced by this invention.

Seven separate 1 liter portions of skim milk were heated in a water bath to a temperature of 32.2° C. Into each sample portion there was then dispersed with mixing agitation a respective weighed amount of octaglycerol monooleate corresponding to a selected concentration between 0.05 and 1.0% on a weight/volume basis based on the total volume of the sample. The treated samples were maintained at 32.2° C. for 15 minutes, then quickly heated to 45° C. and treated with sufficient acetic acid (20–35% V/V) to adjust the pH of the sample to pH 4.6 to precipitate the casein. The thus precipitated casein was washed several times with warm water to remove residual components and pressed to remove excess water. The cholesterol content of each sample was measured by the above described assay and compared on a dry weight basis with a control casein isolated in a similar manner but without the addition of octaglycerol monooleate. The results of this assay are found in Table II.

TABLE II

| OCTAGLYCEROL MONOOLEATE CONCENTRATION | % CHOLESTEROL REDUCTION (DRY WT. BASIS) |
|---|---|
| 0.05% | 29 |
| 0.1% | 29 |
| 0.2% | 83 |
| 0.3% | 90 |
| 0.4% | 87 |
| 0.5% | 56 |
| 1.0% | 24 |

*Herein and afterwards the concentration of octaglycerol monooleate is expressed in terms of weight/volume based on the total volume of the sample.

The above data shows that good reduction in cholesterol content takes place over a wide concentration range of octaglycerol monooleate. Optimum reduction in cholesterol occurs at an emulsifier concentration between 0.2% and 0.5% (on a weight by volume basis).

EXAMPLE 3

This Example illustrates the effect of emulsifier contact time on the cholesterol content of the casein produced by this invention.

Six separate 1 liter samples of skim milk were heated in a water bath to 21° C. Into each sample there were dispersed with agitation 5 grams (0.5% wt/vol) of octaglycerol monooleate. The treated samples were then respectively maintained at 21° C. for a selected time between about 1 and 90 minutes. At the end of this selected time the sample was heated to 45° C. and its pH was adjusted to pH 4.6 by the addition of sufficient acetic acid (20-35% V/V) to precipitate the casein. The precipitated casein was then washed with warm water to remove residual soluble components and pressed to remove excess water. The cholesterol content of each isolated casein was determined by the above described assay and compared on a dry weight basis with a similarly isolated casein which was not treated with the octaglycerol monooleate. The results of the assay are shown in Table III.

TABLE III

| CONTACT TIME | % CHOLESTEROL REDUCTION (DRY WT. BASIS) |
|---|---|
| 1 minute | 24 |
| 15 minute | 51 |
| 35 minute | 54 |
| 50 minute | 62 |
| 70 minute | 63 |
| 90 minute | 53 |

The above data shows that the contact time between the octaglycerol monooleate and the skim milk may be widely varied and still result in good cholesterol reduction in the isolated casein. Optimum cholesterol reduction occurs at a time between 15 and 90 minutes.

EXAMPLE 4

This Example illustrates the effects of emulsifier contact temperature on the cholesterol content of the isolated casein produced by this invention.

Six separate one liter samples of skim milk were heated in a water bath to respective selected temperatures between about 4° and 43° C. To each sample there were then added 5 grams (0.5% wt/vol) of octaglycerol monooleate which was dispersed therein with agitation. The treated samples were maintained at the respective temperatures for 15 minutes. The temperature of each sample was then quickly adjusted to about 45° C. and the pH of each sample mixture was adjusted to about pH 4.6 by the addition of sufficient acetic acid (20-35% V/V) to precipitate the casein. The precipitated casein was removed from the soluble portion of the mixture and washed with water to remove residual whey protein, salts and other soluble components. The washed casein was then pressed to remove excess water. The cholesterol content of each sample was determined using the assay described above and compared on a dry weight basis with a similarly isolated casein which was not treated with the octoglycerol monooleate. The results of this assay are shown in Table IV.

TABLE IV

| CONTACT TEMPERATURE | % CHOLESTEROL REDUCTION (DRY WT. BASIS) |
|---|---|
| 4° C. | 45 |
| 21° C. | 45 |
| 26.7° C. | 53 |
| 32.2° C. | 57 |
| 37.8° C. | 87 |
| 43.3° C. | 95 |

The above data indicates that the temperature may be widely varied and still result in good cholesterol reduction in the isolated casein. The degree of cholesterol reduction increases with increasing temperature. Optimum cholesterol reduction occurs at a temperature between about 26° and 43° C.

EXAMPLE 5

This Example illustrates the effectiveness of the instant process to provide a low cholesterol content isolated casein from an aqueous mixture of dry milk solids.

Two aqueous suspensions of nonfat dry milk were prepared containing 100 grams nonfat dry milk dispersed in 900 ml of water. Each sample was then heated to about 45° C. in a water bath. One sample, representing a control, was treated with acetic acid (20-35% V/V) to adjust the pH of the mixture to about 4.6 to precipitate the casein. The precipitated casein was separated from the mixture, washed six times with warm water and pressed to remove excess water. This control sample was assayed for moisture and for cholesterol determined on a dry weight basis using the above described assay.

Into the second sample portion, representing a test sample, there were dispersed about 3.5 grams of octaglycerol monooleate (corresponding to 0.35% on a weight/volume basis based upon the total volume of the mixture) and the treated sample was maintained at about 45° C. for 45 minutes. The test sample was then treated with sufficient acetic acid 20-35% V/V) to adjust the pH to about 4.6 to precipitate the casein. The precipitated casein was separated from the mixture by decantation, washed six times with warm water and pressed to remove excess moisture. The test sample was then assayed for moisture and for cholesterol content determined on a dry weight basis using the above described assay. The results of these cholesterol assays are found in Table V.

TABLE V

| SAMPLE | % CHOLESTEROL REDUCTION (DRY WT. BASIS) |
|---|---|
| Control | — |
| Test Sample | 85 |

This Example illustrates that this process is remarkably effective to reduce the cholesterol content of casein isolated from an aqueous mixture of dry milk solids.

EXAMPLE 6

This Example illustrates the effect of the emulsifier's hydrophilic lipophilic balance (HLB) on the cholesterol content of the isolated casein produced by this invention.

Eight separate 1 liter portions of skim milk were heated in a water bath to about 43.3° C. To one sample portion heated to 45° C., representing a control sample, there was then added sufficient acetic acid (20–33% V/V) to adjust the pH of the mixture to about 4.6 and to precipitate the casein. The precipitated casein was separated from the mixture, washed six times with about 500 ml of water and simply pressed to remove residual water. This control sample was assayed for moisture and for cholesterol content determined on a dry weight basis using the above described assay.

Into the remaining sample portions, representing test samples, there were separately dispersed by mixing agitation about 5 grams (this amount corresponds to 0.5% on a weight/volume basis based on the total volume of the sample) of the selected emulsifiers having an HLB between 2 and 16 listed in Table VI below. The thus treated sample was maintained at about 43° C. for 15 minutes. The samples were then quickly heated to about 45° C. and sufficient acetic acid (20–35% V/V) was added to adjust the pH to about 4.6 and to precipitate the casein. The precipitated casein was separated from the mixture, washed six times with about 500 ml water and pressed to remove excess water. These test samples were assayed for moisture and for cholesterol content determined on a dry weight basis by the above method and compared with the control sample. The results of these assays are found in Table VI.

TABLE VI

| EMULSIFIER | HLB | % CHOLESTEROL REDUCTION (dry wt. basis) |
|---|---|---|
| Polyoxyethylene (20) Sorbitan Monopalmitate | 15.5 | 20 |
| Octaglycerol Monooleate | 13.0 | 42 |
| Octaglycerol Monostearate | 13.0 | 71 |
| Mixture A | 13.0 | 20 |
| Triglycerol Monostearate | 7.0 | 35 |
| Mixture B | 7.0 | 20 |

TABLE VI-continued

| EMULSIFIER | HLB | % CHOLESTEROL REDUCTION (dry wt. basis) |
|---|---|---|
| Decaglycerol Decaoleate | 2.0 | 0 |

Mixture A contains, by weight, 82.5% polyoxyethylene (20) sorbitan monostearate (HLB 14.9) and 17.5% sorbitan monostearate (HLB 4.7).
Mixture B contains by weight 25% polyoxyethylene (20) sorbitan monostearate and 75% sorbitan monostearate.

The above data shows that emulsifiers having a preferred HLB of between about 7 and 16 are effective to reduce the cholesterol content of the isolated casein. Optimum cholesterol reduction is achieved with the use of the polyglycerol fatty acid esters having an HLB preferably between 7 and 13.

What is claimed is:

1. A method for recovering casein having a reduced cholesterol content comprising solubilizing in a medium selected from the group consisting of skim milk, mixture of nonfat dry milk solids or casein containing cholesterol and water from 0.05% to 1.0% on a weight/volume basis based upon the total volume of the aqueous medium an emulsifying agent having a hydrophilic lipophilic balance of about 7 to 16 at a temperature of from about 4° to 45° C. for a time between about 1 to 90 minutes and then isolating the casein from said medium whereby casein is produced having less than 50% on a dry weight basis of the initial cholesterol bound thereto.

2. The method of claim 1 wherein the emulsifying agent comprises a polyglycerol fatty acid ester.

3. The method of claim 1 wherein the emulsifying agent is selected from the group consisting of octaglycerol monooleate, octaglycerol monostearate and triglycerol monostearate.

4. The method of claim 1 wherein the emulsifying agent comprises a sorbitol fatty acid ester.

5. A process according to claim 1 wherein the emulsifying agent is added to the aqueous medium in an amount from 0.2 to 0.5 percent on a weight/volume basis based upon the total volume of the aqueous medium.

6. A process according to claim 1, wherein the emulsifying agent is added to the aqueous medium at a temperature from about 26° to 43° C.

7. A process according to claim 1 wherein the added emulsifying agent is in contact with the aqueous medium a time between about 15 and 90 minutes before the casein is isolated.

8. A process according to claim 1, wherein the casein is isolated by isoelectric precipitation from the aqueous medium.

9. A process according to claim 1, wherein the casein is isolated by enzymatic coagulation from the aqueous medium.

10. A process according to claim 1, wherein the isolated casein is aqueous extracted to remove residual whey proteins, soluble carbohydrates and soluble salts.

11. A process according to claim 1, wherein the aqueous medium containing the emulsifying agent is agitated before the casein is isolated.

* * * * *